INVENTOR.
Anders Köhler

Patented Apr. 7, 1953

2,634,394

UNITED STATES PATENT OFFICE 2,634,394

MEANS FOR MAKING A REGULATOR ALTERNATIVELY RESPONSIVE TO VOLTAGE AND CURRENT

Anders Köhler, Walhalla, Ludvika, Sweden, assignor to Allmänna Svenska Elektriska Aktiebolaget, Vasteras, Sweden, a corporation of Sweden Application January 22, 1952, Serial No. 267,546
In Sweden January 29, 1951

5 Claims. (Cl. 321—19)

It is known to make a regulator alternatively responsive to a voltage and a current so as to prevent either of these quantities from exceeding a predetermined value (so called knee curve regulation) by connecting in a voltage responsive circuit a rectifier through which is fed a current proportional to the current to be limited (main or load current). When this current exceeds a certain value, it determines alone the current in the responsive circuit, which thus changes from voltage responsive to current responsive.

Thorough investigations have now proved, that it is possible, for effecting a regulation of the main type now described, to connect the rectifier introducing the current into a voltage responsive circuit containing a voltage dependent resistance, and that such a connection even in certain cases affords essential advantages. Such a connection forms the object of the present invention.

Figure 1:
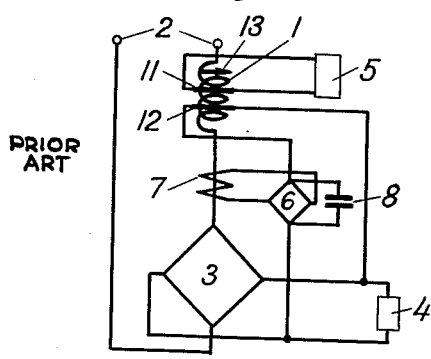
Figure 2:
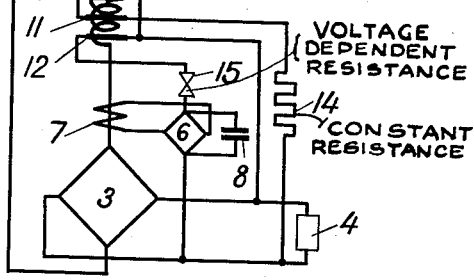
Figure 3:
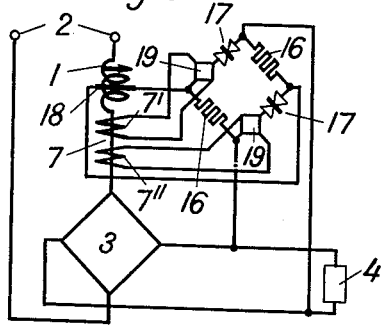
Figure 4:
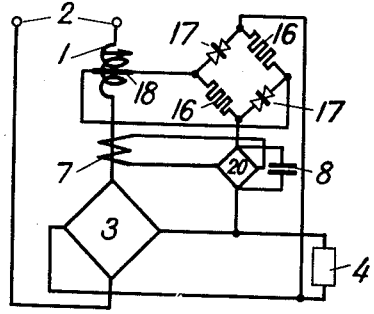
Figure 5:
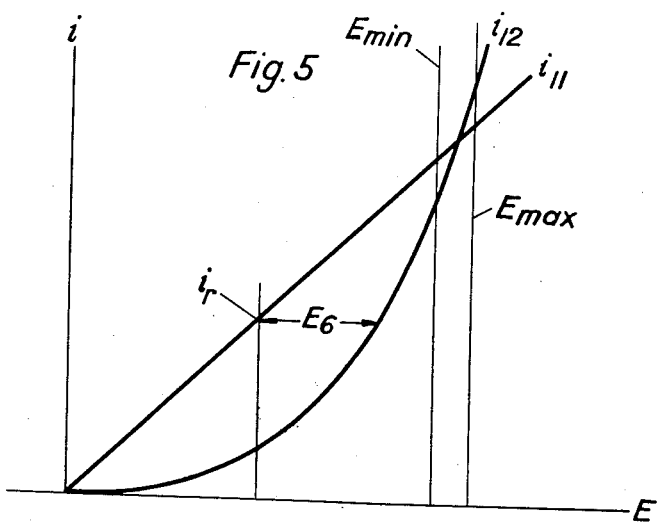

In the accompanying drawing, Fig. 1 shows for comparison a diagram of connections for a voltage regulation having a constant standard current and a current proportional to the voltage and a current limitation by a rectifier connected in the responsive circuit in a manner known in principle, while Figs. 2–4 show diagrams of three different forms of the present invention. Fig. 5 shows a diagram of the manner of operation of a connection according to Fig. 2.

In Fig. 1, 1 is a regulating transductor controlling a rectifier 3 connected to alternating current terminals 2 and feeding a load 4. It is intended to keep, by means of the regulating transductor, the voltage across the load normally constant, but also if necessary under certain load conditions—for instance at a total or partial short-circuit or at a strongly discharged condition of a loading battery—to lower the voltage sufficiently to prevent the current from exceeding a certain value. For accomplishing these purposes, the transductor has two windings 11, 12 opposing each other, one of which 11 is fed from a constant current apparatus 5, while the other 12 is fed from the load terminals, possibly in series with a constant resistance (not shown). The transductor may also have a self magnetisation cooperating with the winding 11 and represented in a conventional manner by the arrow 13. By the members so far described, the voltage across the load is kept practically constant.

The circuit embracing the winding 12 contains, however, also the direct current terminals of a rectifier 6, the alternating current terminals of which are connected to a current transformer 7 connected in the main circuit. The rectifier may be provided with a smoothening condenser 8. As long as the value of the current delivered by the current transformer is kept below the value of the current flowing in the voltage responsive circuit at a normal value of the regulated voltage, the rectifier 6 has no influence on the current in that circuit, but the said current is entirely determined by the regulated voltage. If, on the other hand, the current furnished by the current transformer exceeds that determined by the voltage, the former current alone determines the current in the circuit, and the regulating transductor therefore operates in such a manner, that the last-mentioned current—and thus also the load current—is limited to a certain value.

The arrangement so far described and its general manner of operation are known per se, but it has probably not been ascertained in detail how the arrangement operates in limiting the current, and especially the voltage conditions in the responsive circuit do not appear to have been clearly investigated. If as an example it is assumed, that the load is such that the voltage must be lowered to half the normal value in order that the current shall be limited to a permissible value, this means—since the current in the winding 12 must not be submitted to any considerable variations within the limits of regulation—that the rectifier 6 must furnish the other half of the normal voltage. The current transformer must thus be loaded by this voltage. With this the result may be compared which is obtained by for instance Fig. 2. In this figure, the regulating transductor 1 has a self-magnetisation 13, a positively acting winding 11 fed from the voltage across the load through a constant resistance 14 (which may be that of the winding itself), and a negatively acting winding 12 fed from the voltage across the load through a resistance 15 decreasing at an increasing voltage. In series with the last-mentioned members, there are connected the direct current terminals of a rectifier 6 fed on the alternating current side by a current transformer 7.

In Fig. 5, the abscissae E designate the voltage between the terminals of the load and the ordinates $i$ the currents in the regulating windings of the transductor. The current in the positively acting winding 11 as a function of the voltage E is represented by the straight line $i_{11}$, since the resistance in the circuit through this winding is constant. The current in the negatively acting winding 12 is represented by the curve $i_{12}$, since the current in the positively voltage dependent resistance 15 rises more than in proportion to the voltage. The point of intersection between the curves $i_{l1}$ and $i_{l2}$ represents the normal value of the voltage E, and the two vertical lines $E_{min}$ and $E_{max}$ on both sides thereof the values between which the voltage is normally permitted to vary (the distance between these lines somewhat exaggerated in proportion to the variation as a rule permitted).

If in this connection the voltage need to be lowered, for instance to half its normal value, for limiting the current to a permissible value, the current in the positively acting transducer winding falls to half its normal value (point $i_r$ in Fig. 5). In order to deliver nearly the same current to the negatively acting transducer winding, the rectifier 6 need only furnish an additional voltage $E_\delta$ amounting to considerably less than half—in the example shown only about one fourth—of normal voltage. At the same time, the current delivered by the rectifier need only amount to half of that necessary according to Fig. 1. The total load on the rectifier—and thus on the current transformer—is therefore reduced to a small fraction of what would be necessary according to Fig. 1, whence these members can be made considerably smaller or—if they are amply dimensioned—the precision of the current limitation (the sharpness of the knee of the curve), which depends on the current transformer and on the leakage of the rectifier, may be substantially improved.

The rectifier 6 may as an alternative be connected in the common conductor between one terminal of the load and the regulating windings of the transducer, in which case the action will not be so strongly pronounced as in Fig. 2 but still implies an improvement over Fig. 1.

In Fig. 3, the voltage across the load acts on a bridge connection of constant resistances 16 and voltage dependent resistances 17, the bridge current of which traverses a regulating winding 18 of the transducer 1. In series with the voltage dependent resistances (or possibly only with one of them) there are connected rectifiers 19 fed from the current transformer 7, from separate secondary windings 7', 7" thereof if there are two rectifiers. The manner of operation will be substantially identical to that of Fig. 2.

In Fig. 4, the voltage across the load also acts on a bridge connection of constant and voltage dependent resistances 16, 17 respectively, the bridge current of which traverses a regulating winding 18 of the transducer 1. A rectifier 20 fed from the transformer 7 here lies in series with the entire bridge connection.

I claim as my invention:

1. Means for voltage regulation and current limitation comprising a transducer and a rectifier and a load connected in series, means, including constant and voltage dependent resistances, for creating a magnetizing component of said transducer proportional to the difference between two currents, each fed from a voltage to be regulated, one across a substantially constant and the other across a voltage dependent resistance, and a rectifier fed by a current varying with the load current and connected in series in a voltage responsive circuit feeding a winding of said transducer.

2. Means for voltage regulation and current limitation comprising a transducer and a rectifier connected in series therewith, two circuits and a load fed from the voltage across said load and containing mutually opposing windings on said transducer, one of said circuits containing a substantially constant resistance and the other a voltage dependent resistance, and a rectifier fed on its alternating current side by a current varying with the load current and connected on its direct current side in the circuit containing said voltage dependent resistance.

3. Means for voltage regulation and current limitation comprising a transducer and a rectifier and a load connected in series, two circuits fed from the voltage across said load and containing mutually opposing windings on said transducer and resistances of different character, one conductor being common to both said circuits, and a rectifier fed on its alternating current side by a current varying with the load current and connected on its direct current side in the said common conductor.

4. Means for voltage regulation and current limitation comprising a transducer and a rectifier and a load connected in series, a bridge polygon fed from the voltage across said load and containing in different branches substantially constant and voltage dependent resistances and in a bridge connection a magnetizing winding on said transducer, and rectifiers fed on their alternating current side by currents varying with the load current and connected on their direct current side in series with said voltage dependent resistances.

5. Means for voltage regulation and current limitation comprising a transducer and a rectifier and a load connected in series, a bridge polygon fed from the voltage across said load and containing in different branches substantially constant and voltage dependent resistances and in a bridge connection a magnetizing winding on said transducer, and a rectifier fed on its alternating current side by a current varying with the load current and connected on its direct current side in series with said bridge polygon.

ANDERS KÖHLER.

REFERENCES CITED

The following references are of record in the file of this patent:

UNITED STATES PATENTS

| Number | Name | Date |
| --- | --- | --- |
| 2,322,130 | Hedding | June 15, 1943 |
| 2,558,094 | King | June 26, 1951 |

FOREIGN PATENTS

| Number | Country | Date |
| --- | --- | --- |
| 442,883 | Great Britain | Feb. 17, 1936 |